United States Patent [19]

Kessi

[11] Patent Number: 4,808,910

[45] Date of Patent: Feb. 28, 1989

[54] HIGH VOLTAGE MEASUREMENT TRANSFORMER FOR SUSPENSION FROM A HIGH VOLTAGE SWITCHING APPARATUS

[75] Inventor: Erich Kessi, Unterentfelden, Switzerland

[73] Assignee: Sprecher & Schuh AG, Aarau, Switzerland

[21] Appl. No.: 835,350

[22] Filed: Mar. 3, 1986

[30] Foreign Application Priority Data

Mar. 14, 1985 [CH] Switzerland ............ 1136/85

[51] Int. Cl.$^4$ ............................................. H01F 40/06
[52] U.S. Cl. ..................................... 323/358; 336/174;
336/175; 336/68; 324/127
[58] Field of Search ............... 323/358; 324/127;
336/173, 174, 175, 68, 92; 307/147; 361/335,
417, 419

[56] References Cited

U.S. PATENT DOCUMENTS

| 3,380,009 | 4/1968 | Miller | 336/174 |
|---|---|---|---|
| 3,725,741 | 4/1973 | Misencik | 336/174 |
| 4,258,410 | 3/1981 | Boersma . | |
| 4,354,154 | 10/1982 | Schiemann | 336/175 |

FOREIGN PATENT DOCUMENTS

| 783947 | 6/1972 | Belgium . |
|---|---|---|
| 1229614 | 12/1966 | Fed. Rep. of Germany . |
| 1538061 | 6/1969 | Fed. Rep. of Germany . |
| 1803633 | 4/1970 | Fed. Rep. of Germany . |
| 2939934 | 4/1981 | Fed. Rep. of Germany . |
| 3230091 | 1/1984 | Fed. Rep. of Germany . |
| 3313192 | 10/1984 | Fed. Rep. of Germany . |
| 1591338 | 4/1970 | France . |
| 2133905 | 12/1972 | France . |

OTHER PUBLICATIONS

Publication entitled "J and P Switchgear Book", Seventh Edition, by R. T. Lythall.

Primary Examiner—Peter S. Wong
Assistant Examiner—Anita M. Ault
Attorney, Agent, or Firm—Werner W. Kleeman

[57] ABSTRACT

The current converter or transformer component of a high voltage measurement transformer comprises a primary lead or conductor which is surrounded by secondary windings or optical conducting elements. The primary and secondary components of the current converter or transformer component are housed in a casing having an integrally formed entry duct for the secondary leads. The secondary components of the current converter or transformer component are surrounded by plastic or synthetic insulation material. This insulation material or insulation also surrounds a channel for the secondary leads extending completely through the entry duct. The primary lead or conductor is provided with connecting flanges at both ends for mechanically or electrically connecting the high voltage measurement transformer to a high voltage or high power circuit breaker or similar device. The high voltage measurement transformer is suspended from the circuit breaker by this connection such that no further support is necessary for the high voltage measurement transformer.

23 Claims, 2 Drawing Sheets

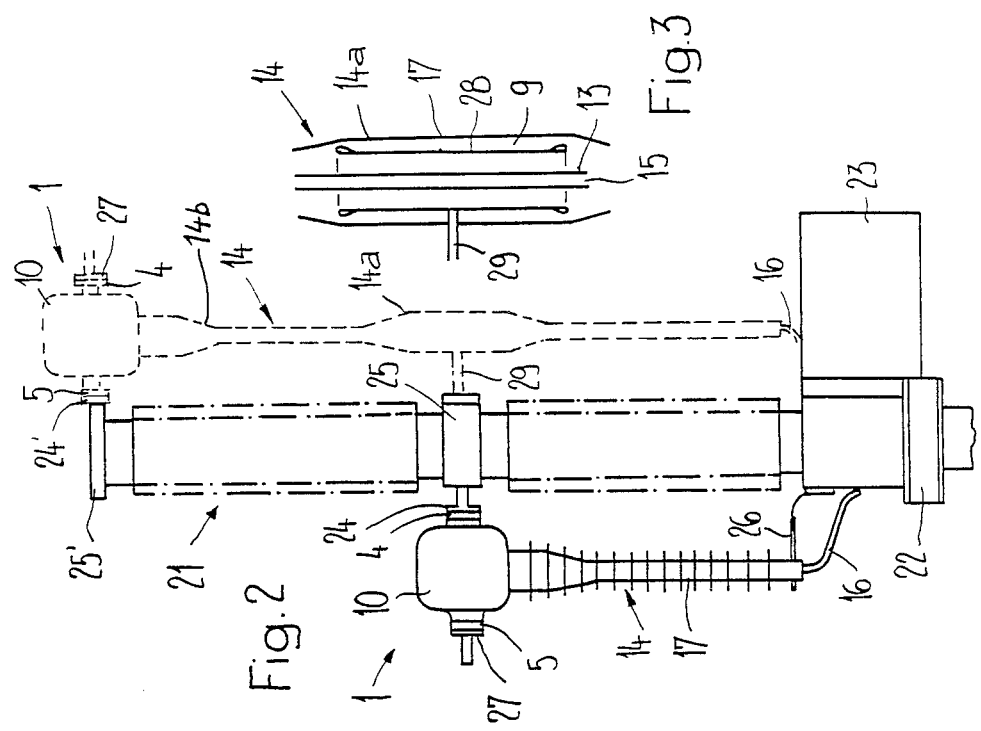
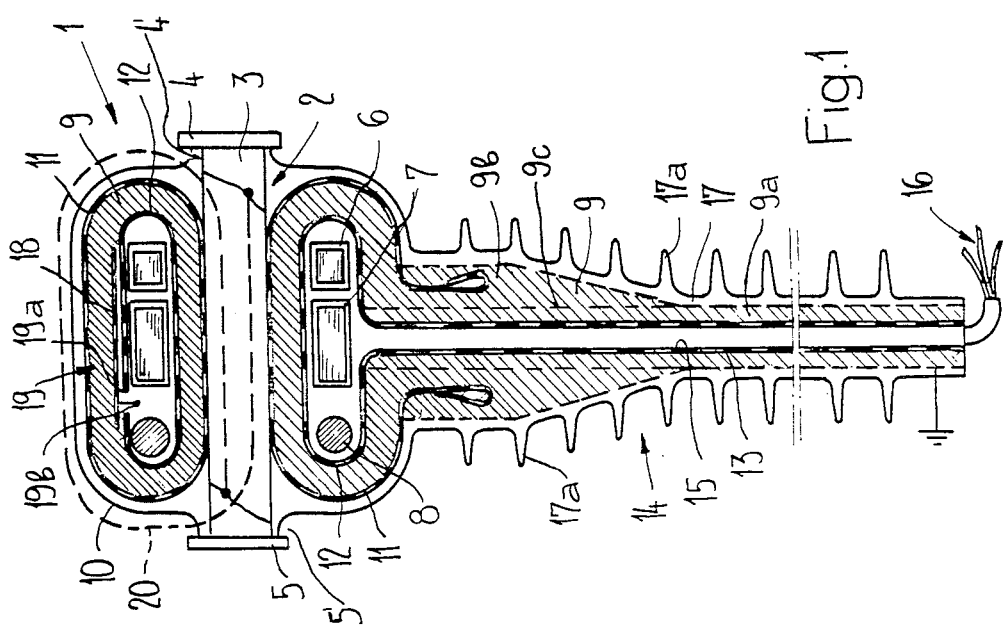

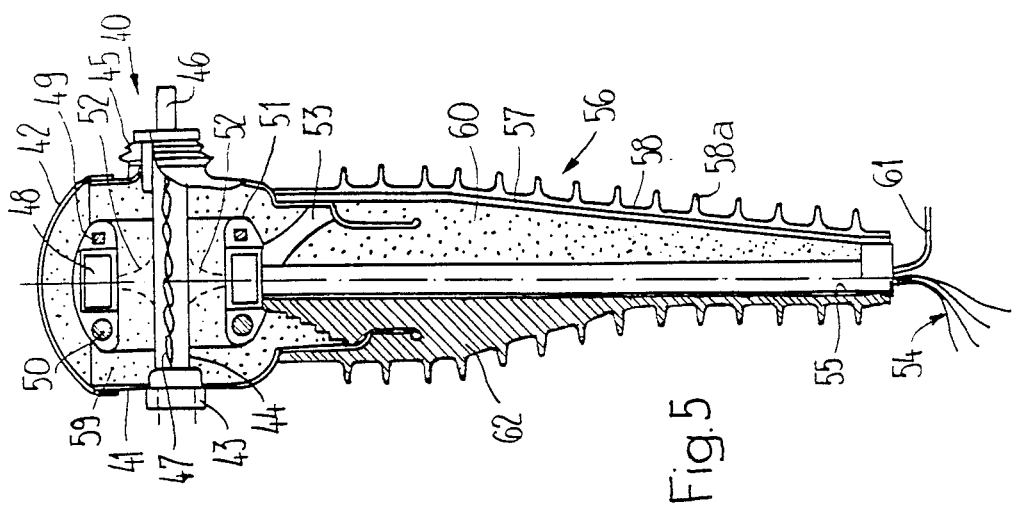
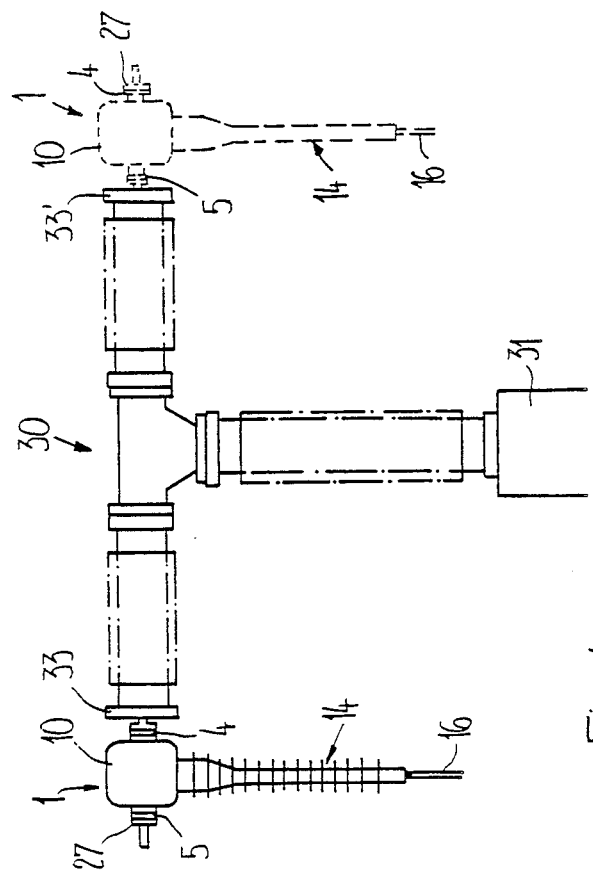
Fig. 5
Fig. 4

HIGH VOLTAGE MEASUREMENT TRANSFORMER FOR SUSPENSION FROM A HIGH VOLTAGE SWITCHING APPARATUS

BACKGROUND OF THE INVENTION

The present invention broadly relates to high voltage measurement equipment and, more specifically, pertains to a new and improved construction of a high voltage measurement transformer and for high voltage switching apparatus.

Generally speaking, the high voltage measurement transformer of the present invention is constructed conjointly with a current converter or transformer component situated in an upper head portion of the high voltage measurement transformer and has a detachable electrical and mechanical attachment means in the vicinity of at least one primary terminal of the current converter or transformer component connected to a predeterminate component or portion of a high voltage switching apparatus.

In other words, the high voltage measurement transformer of the present invention is for high voltage switching apparatus and comprises a current converter component situated in an upper or head portion of the high voltage measurement transformer, at least one primary electrical connection terminal for the current converter component situated in a predeterminate region of the at least one current converter component and detachable connection means for mechanically and electrically connecting the high voltage measurement transformer to a predetermined component of the high voltage switching apparatus.

A known high voltage switching apparatus of the initially mentioned type, as for example disclosed in the West German Patent Application No. 1,488,165, comprises a high voltage or high power vacuum circuit breaker with a horizontal longitudinal axis which is supported at one end by a supporting insulator accommodating an actuation rod and which is mechanically and electrically connected at the other end with a detachable current converter or transformer mounted in the upper portion of a high voltage switching apparatus. The current converter or transformer rests upon a second supporting insulator which supports not only the current converter or transformer but also the circuit breaker. The secondary leads or wires running to the secondary windings of the current converter or transformer pass through a grounded tube or conduit located in the interior of the second supporting insulator which moreover supports the secondary windings of the current converter or transformer. The interior space of the current converter or transformer is filled with an insulating gas (e.g. sulfur hexafluoride).

As previously mentioned this known vacuum circuit breaker is not directly supported at one end but is supported by means of the current converter or transformer resting upon the second supporting insulator, causing the current converter or transformer to become effectively a portion of the entire circuit breaker. This necessitates considerable expenditure of time and effort for the installation and removal of the current converter or transformer as it required temporary support or propping up of the vacuum circuit breaker.

SUMMARY OF THE INVENTION

Therefore, with the foregoing in mind, it is a primary object of the present invention to provide a new and improved construction of a high voltage measurement transformer for a high voltage switching apparatus which does not exhibit the aforementioned drawbacks and shortcomings of the prior art construction.

Another and more specific object of the present invention aims at providing a new and improved construction of a high voltage measurement transformer for a high voltage switching apparatus of the aforementioned type which makes possible space-saving construction features and allows for simple installation and removal of the high voltage measurement transformer without necessitating extensive additional accessories or tools.

Yet a further significant object of the present invention aims at providing a new and improved construction of a high voltage measurement transformer of the character described for suspension for a high voltage switching apparatus which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the high voltage measurement transformer of the present invention for suspension from a high voltage switching apparatus is manifested by the features that the high voltage measurement transformer is constructed as an independent component and is suspended in a region of at least one of the primary connections or terminals of the current converter or transformer component from a further portion of the high voltage switching apparatus by means of the aforementioned connection or suspension means.

In other words, the high voltage measurement transformer of the present invention is manifested by the features that the detachable connection means suspendingly supports the high voltage measurement transformer as an independent unit in the predeterminate region from the predeterminate component.

Since the high voltage measurement transformer is constructed as an independent component and is suspended from the portion of the high voltage switching apparatus with which it is connected in a region of at least one of the primary connections or terminals of the current converter or transformer component and therefore does not require supportive means at its base, thus permitting the omission of supplementary weight-supporting means, a simple and space-saving construction is made possible. The base of the high voltage measurement transformer need not be designed to bear heavy mechanical stresses, since the base does not support any weight and thus does not bear any stress. The base of the high voltage measurement transformer also does not have to bear any forces or stresses ensuing from input leads or wires. The high voltage measurement transformer can be installed or removed with relatively little expenditure of time and effort without requiring access to remaining portions of the high voltage switching apparatus.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 1 schematically shows a longitudinal section of an initial embodiment of a high voltage measurement transformer;

FIG. 2 schematically shows a side view of a high voltage or high power circuit breaker attached to a high voltage measurement transformer according to FIG. 1;

FIG. 3 schematically shows a portion of part of the entry duct of FIG. 2 for the secondary leads or wires of the high voltage measurement transformer on an enlarged scale;

FIG. 4 schematically shows a side view of another embodiment of high voltage or high power circuit breaker attached to a high voltage measurement transformer according to FIG. 1; and FIG. 5 schematically shows a second embodiment of a high voltage measurement transformer in a sectional view analogous to that of FIG. 1.

DETAILED DESCRIPTION OF THE PREFERRED EMBODIMENTS

Describing now the drawings, it is to be understood that to simplify the showing thereof only enough of the structure of the high voltage measurement transformer suspended from a high voltage switching apparatus has been illustrated therein as is needed to enable one skilled in the art to readily understand the underlying principles and concepts of this invention. Turning now specifically to FIG. 1 of the drawings, the apparatus illustrated therein by way of example and not limitation will be seen to comprise components of a high voltage measurement transformer 1. The high voltage measurement transformer 1 comprises a current converter or transformer component 2 which has a substantially rod-shaped primary lead or conductor 3. The primary lead or conductor 3 extends through the high voltage measurement transformer 1 and is provided at both ends or terminals 4' and 5' with connecting flanges 4 and 5 of electrically conductive material. The secondary portion of the current converter or transformer component 2 is arranged around the primary lead or conductor 3 and comprises, for example, two annular iron cores carrying secondary windings or coils 6 and 7. This secondary portion of the current converter or transformer component 2 can also accommodate an optical conducting element 8 in lieu of or in addition to the secondary windings 6 and 7. This principle is known, for example, from the published French patent application No. 2,430,112, published Jan. 25, 1980. It is also possible to accommodate electromagnetic components, such as, for example, Hall-effect elements, in the secondary region of the current converter or transformer component 2 which principle is known per se (cf. Swiss Pat. No. 588,762, granted Apr. 15, 1977).

The secondary portion 6, 7 and 8 of the current converter or transformer component 2 is surrounded by insulation 9, such as a synthetic insulation material, preferably a potting or casting resin having an epoxide, polyester, polyurethane or silicon base. The primary side or portion 3 and the secondary side or portion 6, 7 and 8 of the current converter or transformer component 2 both as surrounded by a housing or casing 10. Should the housing or casing 10 be constructed of an electrically conductive material, then the housing or casing 10 must be insulated from the primary lead or conductor 3.

The insulation 9 is provided on its outer surface confronting the primary lead or conductor 3 with a first conductive film or covering 11 maintained at a predetermined nominal potential. On the inner surface of the current converter or transformer component 2 confronting the secondary components 6, 7 and 8, the insulation 9 is provided with a second conductive film or covering 12 which is grounded or connected to an earthing terminal. This second conductive film or covering 12 is extended to form a grounding jacket 13. The grounding jacket 13 also extends through a lead-in or entry duct 14 formed integrally with the housing or casing 10. Furthermore, the grounding jacket 13 surrounds a channel 15 which may constitute a central channel and extends longitudinally within the lead-in or entry duct 14. The secondary leads or wires 16 leading to the secondary windings 6 and 7 or to the optical conducting element 8 extend through the channel 15. There is a protective housing or casing 17 made from a synthetic material or plastic surrounding the channel 15 and the grounding jacket 13. The protective housing or casing 17 is provided with shielding or insulating fins 17a. The space between the protective housing or casing 17 and the grounding jacket 13 is also filled with the same insulation 9 as that surrounding the secondary components 6, 7 and 8 of the current converter or transformer component 2, i.e. preferably a potting or casting resin.

A third conductive film or covering 18 is arranged between the outer conductive film or covering 11 and the inner conductive film or covering 12 within the insulation 9 which forms conjointly with both conductive films or coverings 11 and 12 a capacitive voltage divider 19. Pick-off points or taps for voltage measurements are indicated by the reference numerals 19a and 19b. Accordingly, the high voltage measurement transformer 1 not only permits current measurement but also voltage measurement.

If necessary, in lieu of a single primary lead or conductor 3, a primary winding surrounding the secondary components 6, 7 and 8 of the current converter or transformer component 2 can be provided as indicated by a dashed line 20. In this case the rod-shaped primary lead or conductor 3, which also can take the form of a tube or conduit, serves as a support means for the primary winding 20 as well as a voltage-conducting element.

The insulation 9 is preferably formed in three sequential steps during manufacture of the high voltage measurement transformer 1. In the first step, an insulation portion 9a is formed which surrounds the channel 15 but which is limited to the area contained within the dashed lines 9c shown in FIG. 1. Thereafter a remaining insulation portion 9b of the insulation 9 is formed. The protective housing or casing 17 is formed conjointly with the protective or insulating fins 17a in a third step. It is also possible of course to form the insulation 9 and the protective housing or casing 17 in a single operation.

FIGS. 2-4 are useful for explaining the installation possibilities of the high voltage measurement transformer 1 according to FIG. 1 in a high voltage switching apparatus.

A conventional high voltage or power circuit breaker 21 for indoor or outdoor high voltage switching apparatus is shown in FIG. 2 which rests on a support structure 22 upon which a switching drive or actuator 23 is also mounted. The high voltage measurement transformer 1 is attached with a flange connector 4 to a mounting flange or flange connector 24 which is connected to a lower connection or terminal 25 of the switching apparatus or circuit breaker 21. The high voltage measurement transformer 1 is connected both electrically as well as mechanically to the high voltage switching apparatus or circuit breaker 21 by means of the flange connectors 4 and 24. At the base end, the entry duct 14 is connected with a mounting 26 which is fastened to the switching apparatus or circuit breaker 21 or to the support structure 22 and which serves only as a lateral guide for the entry duct 14 without carrying any stresses or weight. Another flange connector 5 of the high voltage measurement transformer 1 is fastened to a mounting part or terminal 27 for connection with an electrical conductor or line such as a bus bar or heavy duty cable.

The high voltage measurement transformer 1 is suspended from the flange connector 24 of the switching apparatus or circuit breaker 21 and is not otherwise supported, in particular not from below. The weight of the high voltage measurement transformer 1 is therefore supported exclusively and entirely by the switching apparatus or circuit breaker 21. It is therefore not necessary to provide a special supporting structure for the high voltage measurement transformer 1. In particular, since the high voltage measurement transformer 1 need not be supported by the entry duct 14, the entry duct 14 can be designed and constructed from lightweight material, i.e. the entry duct 14 need not be designed to carry compressive forces or stresses which would arise if the high voltage measurement transformer 1 were supported at the base.

The installation and removal of the high voltage measurement transformer 1 is relatively simple without requiring access into the switching apparatus or circuit breaker 21.

The high voltage measurement transformer 1 can also be mounted on an upper connection or terminal 25' of the high voltage switching apparatus or circuit breaker 21, as indicated by a dashed line 14b in FIG. 2. The configuration shown at the right of FIG. 2 has the high voltage measurement transformer 1 mounted with the flange connector 5 to a mounting flange or flange connector 24' of the switching apparatus or circuit breaker 21, while the other flange connector 4 is fastened to a connecting portion 27 for attachment to a not particularly shown electrical line or conductor. The entry duct 14 extendsthe entire height of the switching apparatus or circuit breaker 21. In order to avoid arcing between the lower connection or terminal 25 of the switching apparatus or circuit breaker 21 and the entry duct 14, a cylindrical control element 28 (cf. FIG. 3) is embedded inside the entry duct 14 in a region near the lower connection or terminal 25. The cylindrical control element 28 is spaced at a predetermined distance or separation from and surrounds the channel 15 and is connected to the lower connection or terminal 25 through an electrical connection 29. The entry duct 14 is wider at the region 14a to accommodate the cylindrical control element 28.

The high voltage switching apparatus shown in FIG. 4 has a high voltage or high power circuit breaker 30 built in a substantially T-configuration and supported by a support structure 31. As was described in relation to the preferred embodiment shown in FIG. 2, the high voltage measurement transformer 1 is flanged to a connection or terminal 33 or 33' of the circuit breaker 30 by means of the respective flange connector 4 or 5. The other respective flange connector 5 or 4 is fastened to a connecting portion 27 for attachment to a not particularly shown electrical line or conductor. The high voltage measurement transformer 1 is also in this case suspended from the circuit breaker 30 and is not otherwise supported. The mounting and support of the high voltage measurement transformer 1 are the same as for the preferred embodiments illustrated in FIGS. 2 and 4.

Another exemplary embodiment of a high voltage measurement transformer is shown in FIG. 5 which utilizes an insulating gas rather than the solid insulating material 9.

The current converter or transformer 40 shown in FIG. 5 comprises a self-supporting head casing 41 that is closed at the top by a cover or lid 42. The cover or lid 42 is hermetically sealed to the head casing 41. The head casing 41 has a flange connector 43 on one side in order to mechanically and electrically connect the current converter or transformer 40 to a portion of a not particularly shown high voltage switching apparatus. A thin-walled tube or conduit 44 is fastened to the flange connector 43 and passes through the head casing 41 and penetrates an insulator 45 mounted on the head casing 41. This insulator 45 is not necessary if the head casing 41 is constructed from an electrically insulative material. The tube or conduit 44 is fastened to a flange connector 46 to be connected to an electrical conductor or line such as a bus bar or heavy duty cable. A primary lead or conductor 47 passes through the inside of the tube or conduit 44 and is connected to the flange connectors 43 and 46. This primary lead or conductor 47 can be made of solid wire or stranded cable. It is also possible to use the tube or conduit 44 as a primary lead or conductor. Naturally in this case it is necessary to select the thickness of the wall of the tube or conduit 44 according to the amount of current flowing through it. Moreover, it is also possible to use a primary winding rather than a single primary lead or conductor as was described in relation to FIG. 1. In this case the tube or conduit 44 would act as a supporting member for this primary winding.

As was illustrated in the initially embodiment shown in FIG. 1, the primary lead or conductor 47 is surrounded by the components of the secondary side of the current converter or transformer 40. These secondary-side components are shown in FIG. 5 as iron cores carrying secondary windings 48 and 49 and as an optical conducting element 50, as illustrated in FIG. 1. Moreover, it is also possible in this configuration to accommodate electromagnetic components, for example Hall-effect elements, on the secondary side. The secondary-side components 48, 49 and 50 are contained in the interior of a shielded compartment 51 which is supported and held in place using the respective supporting and centering elements 52 and 53 and are supported by the tube or conduit 44 or the head casing 41.

Secondary leads or wires 54 connected to the secondary-side components 48, 49 and 50 extend through a channel 55 which longitudinally traverses a lead-in or entry duct 56 attached to or formed integrally with the head casing 41. This entry duct 56 comprises an insulating jacket 57 separated by a predetermined distance or spacing from the channel 55. The outside surface of the insulating jacket 57 comprises a protective casing 58 with shielding or insulating fins 58a as illustrated in the right half of FIG. 5. The insulating jacket 57 and the protective casing 58 are made of a synthetic material or plastic. Both an interior space 59 of the head casing 41 and also a space 60 between the channel 55 and the insulating jacket 57 are filled with an insulating gas, which preferably is sulfur hexafluoride. A connecting conduit 61 runs inside the channel 55 and is used to fill the spaces 59 and 60 with insulating gas as well as to monitor these spaces.

Another preferred embodiment of the entry duct 56 is illustrated in the left half of FIG. 5. In this embodiment the channel 55 is surrounded by an insulating body 62 provided with shielding or insulating fins and made from a synthetic material which preferably is potting or casting resin. In this configuration the entry duct 56 is constructed similar to the embodiment illustrated in FIG. 1.

The current converter or transformer 40 shown in FIG. 5 is connected in the same manner as the high voltage measurement transformer 1 shown in FIG. 1 to the high voltage or high power circuit breaker 30 by means of the flange connector 43 and in this manner is mechanically and electricaly connected to the circuit breaker 30. The current converter or transformer 40 is thus also suspended from the circuit breaker 30 and need not be supported from below as has already been explained in relation to FIGS. 2-4.

Although the high voltage measurement transformer 1 or the current converter or transformer component 40 are preferably flanged directly to a high voltage or high power circuit breaker in the manner described, it is also conceivable to suspend the transformers 1 and 40 from another component or portion of a high voltage switching apparatus with the flange connectors 4, 5 and 43. Furthermore, it is conceivable to mount the transformers 1 and 40 not only on one side but on portions of both of two opposing sides of the high voltage switching apparatus. In this case the transformers 1 and 40 are still suspended as before, but they are no longer suspended on one side only but on two opposing sides.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A high voltage switching apparatus having a high voltage measurement transformer constructed conjointly with a current converter component in a head portion of the high voltage measurement transformer, comprising:
    two primary terminals provided for the current converter component;
    electrical and mechanical attachment means provided on the high voltage measurement transformer and situated proximate to one of said two primary terminals;
    means for detachably attaching said high voltage measurement transformer by said electrical and mechanical attachment means provided on the high voltage measurement transformer to a predeterminate portion of the high voltage switching apparatus;
    said high voltage measurement transformer being constructed as an independent detachable component; and
    said electrical and mechanical attachment means suspending said high voltage measurement transformer from said predeterminate portion of said high voltage switching apparatus in a region of said one of the two primary terminals of said current converter component.

2. The high voltage switching apparatus as defined in claim 1, wherein:
    said electrical and mechanical attachment means comprises a mechanical fastening element arranged in said region of said one of the two primary terminals of said current converter component for mechanically connecting said high voltage measurement transformer with said predeterminate portion of the high voltage switching apparatus.

3. The high voltage switching apparatus as defined in claim 2, wherein:
    said mechanical fastening element comprises a flange-like element.

4. The high voltage switching apparatus as defined in claim 2, further including:
    an electrical conductor located in the interior of said high voltage measurement transformer;
    said mechanical fastening element being electrically conductive; and
    said mechanical fastening element being connected to said electrical conductor.

5. The high voltage switching apparatus as defined in claim 1, further including:
    an electrical current conductor provided for said current converter component;
    said electrical current conductor defining a primary conductor;
    said electrical current conductor extending through said high voltage measurement transformer;
    said current converter component comprising secondary components; and
    said electrical current conductor being surrounded by said secondary components.

6. The high voltage switching apparatus as defined in claim 5, wherein:
    said current converter component comprises a primary winding; and
    said electrical current conductor being connected with said primary winding.

7. The high voltage switching apparatus as defined in claim 5, wherein:
    said primary conductor and said secondary components of said current converter component are insulated from one another by a solid insulating material.

8. The high voltage switching apparatus as defined in claim 7, wherein:
    said solid insulating material comprises a synthetic material.

9. The high voltage switching apparatus as defined in claim 5, wherein:
    said primary conductor and said secondary components of said current converter component are insulated from one another by a gaseous insulating material.

10. The high voltage switching apparatus as defined in claim 9, wherein:
    said gaseous insulating material comprises sulfur hexafluoride.

11. The high voltage switching apparatus as defined in claim 5, further including:
    a housing;
    a primary conductor;

said primary conductor and said secondary components of said current converter component being enclosed by said housing;

said current converter component having a plurality of secondary leads;

an entry duct for said plurality of secondary leads; and said entry duct extending from said housing.

12. The high voltage switching apparatus as defined in claim 11, wherein:

said entry duct extends downwardly from said housing.

13. The high voltage switching apparatus as defined in claim 1, further including:

lateral connection means provided on said high voltage measurement transformer for mounting said high voltage measurement transformer to a switching device of the high voltage switching apparatus.

14. The high voltage switching apparatus as defined in claim 1, further including:

means for supporting said high voltage measurement transformer such that said high voltage measurement transformer is free of support from below.

15. The high voltage switching apparatus as defined in claim 1, further including:

a central channel;

an insulating material surrounding said central channel; and a plurality of secondary leads passing through said central channel.

16. The high voltage switching apparatus as defined in claim 15, wherein:

said insulating material comprises a solid insulating material.

17. The high voltage switching apparatus as defined in claim 16, wherein:

said solid insulating material comprises a synthetic material.

18. The high voltage switching apparatus as defined in claim 17, wherein:

said synthetic material comprises a potting resin.

19. The high voltage switching apparatus as defined in claim 15, wherein:

said insulating material comprises a gaseous insulating material.

20. The high voltage switching apparatus as defined in claim 19, wherein:

said gaseous insulating material comprises sulfur hexafluoride.

21. A high voltage switching apparatus having a high voltage measurement transformer constructed conjointly with a current converter component in a head portion of the high voltage measurement transformer, comprising:

at least one primary terminal provided on the current converter component;

electrical and mechanical attachment means provided on the current converter component and situated proximate to said at least one primary terminal;

means for detachably attaching said high voltage measurement transformer by said electrical and mechanical attachment means provided on the current converter component to a predeterminate portion of the high voltage switching apparatus;

said high voltage measurement transformer being constructed as an independent detachable component;

said electrical and mechanical attachment means suspending said high voltage measurement transformer from said predeterminate portion of said high voltage switching apparatus in a region of said at least one primary terminal of said current converter component;

an electrical current conductor provided for said current converter component;

said electrical current conductor defining a primary conductor;

said electrical current conductor extending through said high voltage measurement transformer;

said current converter component comprising secondary components;

said electrical current conductor being surrounded by said secondary components;

said current converter component comprises a primary winding;

said electrical current conductor being connected with said primary winding;

said primary winding and said secondary components of said current converter component are insulated from one another by a solid insulating material;

said solid insulating material being located between said primary winding and said secondary components;

said solid insulating material having a primary side and secondary side;

said solid insulating material being provided with a first electrically conductive coating on said primary side thereof and a second electrically conductive coating on said secondary side thereof;

a third electrically conductive coating being arranged between said first electrically conductive coating and said second electrically conductive coating; and said third electrically conductive coating forming conjointly with said first and second electricaly conductive coatings a capacitive voltage divider.

22. A high voltage measurement transformer supported in a high voltage switching apparatus, comprising:

a current converter component situated in a head portion of the high voltage measurement transformer; and said current converter component having a mounting element situated in a region of one of two primary terminals for said current converter component for mechanically and electrically connecting the high voltage measurement transformer in a suspendingly supported manner to a predetermined component of the high voltage switching apparatus.

23. A high voltage measurement transformer for high voltage switching apparatus, comprising:

a current converter component situated in a predetermined portion of the high voltage transformer;

two primary electrical connection terminals for said current converter component, one of said primary electrical connection terminals being situated in a predeterminate region of the current converter component;

connection means for mechanically and electrically connecting the high voltage measurement transformer in a detachable manner to a predeterminate component of the high voltage switching apparatus; and said connection means suspendingly and detachably supporting the high voltage measurement transformer as an independent unit in said predeterminate region of the current converter component from said predeterminate component of the high voltage switching apparatus.

* * * * *